United States Patent

Nishimura

Patent Number: 5,734,714
Date of Patent: Mar. 31, 1998

[54] SUBSCRIBER LINE INTERFACE CIRCUIT CAPABLE OF REALIZING BY A C-MOS CIRCUIT

[75] Inventor: Kouichi Nishimura, Tokyo, Japan

[73] Assignee: NEC Corporation, Tokyo, Japan

[21] Appl. No.: 718,181

[22] Filed: Sep. 19, 1996

[30] Foreign Application Priority Data

Sep. 22, 1995 [JP] Japan ................................. 7-269115

[51] Int. Cl.$^6$ ........................................................ H04M 1/00
[52] U.S. Cl. ........................... 379/399; 379/390; 379/394; 379/398; 379/413
[58] Field of Search ............................... 379/390, 394, 379/399, 398, 413, 347

[56] References Cited

U.S. PATENT DOCUMENTS 4,147,900  4/1979  Gaetano et al.
4,484,032  11/1984  Rosenbaum.
4,760,595  7/1988  Arai .................................... 379/398
5,227,732  7/1993  Hong.
5,406,631  4/1995  Takeda et al. ........................ 381/4

*Primary Examiner*—Krista Zele
*Assistant Examiner*—Shih-Wen Hsieh
*Attorney, Agent, or Firm*—Whitham, Curtis, Whitham & McGinn

[57] ABSTRACT

A balanced amplifier delivers a detection voltage in order to carry out power supply control. A level shift circuit shifts the level of the detection voltage to a level shift voltage for a +5 Volts system, namely, a low withstand voltage system. An adder adds a reference voltage $V_{REF2}$ to the level shift voltage as a D.C bias voltage and produces an added voltage. A variable attenuator attenuates the added voltage and produces an attenuated voltage. A subtracter subtracts the reference voltage $V_{REF2}$ from the attenuated voltage and produces a subtracted voltage. The subtracted voltage is converted into a current by a voltage-current converting circuit and turns back to the balanced amplifier as a signal for a high withstand voltage system. Thus, a signal process can be carried out by a circuit of a low withstand voltage.

5 Claims, 4 Drawing Sheets

5,734,714

SUBSCRIBER LINE INTERFACE CIRCUIT CAPABLE OF REALIZING BY A C-MOS CIRCUIT

BACKGROUND OF THE INVENTION

This invention relates to a subscriber line interface circuit which is used for a telephone exchange system.

The subscriber line interface circuit is included in an exchange system. As will later become clear, such a subscriber line interface circuit comprises a balanced type operational amplifier connected to two-wire lines, a feedback control unit connected to the operational amplifier for determining a feed resistance by the use of a voltage discriminator, a low-pass filter connected to the voltage discriminator, and a voltage-current converting circuit connected between the low-pass filter and the operational amplifier.

Generally, a −48 Volt power source system is used for the low-pass filter, the voltage discriminator, and the operational amplifier. Accordingly, it is required that the low-pass filter must be implemented by circuit elements having high withstand voltage characteristic. These circuit elements become expensive. This applies to the voltage discriminator. In particular, the low-pass filter and the voltage discriminator raise in cost when these are implemented by an LSI (Large Scale Integrated Circuit). In addition to the high cost, these are not fit for changing the feed resistance, a constant of a constant current value, or the like, by software control by the use a CPU (Central Processing Unit) and the like.

SUMMARY OF THE INVENTION

It is therefore an object of this invention to provide a subscriber line interface circuit which is capable of implementing by a C-MOS circuit at a low cost.

A subscriber line interface circuit according to this invention is connected to two-wire lines and comprises a balanced amplifier having inverting and non-inverting input terminals and inverting and non-inverting output terminals. The balanced amplifier amplifies an input voltage applied between the inverting and the non-inverting input terminals and produces inverting and non-inverting outputs defined by inverting and non-inverting voltages which have the different polarity and the same amplitude on the basis of a first reference voltage. The subscriber line interface circuit further comprises a first resistor connected between one line of the two-wire lines and the inverting input terminal, a second resistor connected between another line of the two-wire lines and the non-inverting input terminal, a third resistor connected between the inverting input terminal and the non-inverting output terminal, a fourth resistor connected between the non-inverting input terminal and the inverting output terminal, a fifth resistor connected between the one line of the two-wire lines and the inverting output terminal, and a sixth resistor connected between the Other line of the two-wire lines and the non-inverting output terminal.

According to an aspect of this invention, the subscriber line interface circuit further comprises a level shift circuit having attenuation function for shifting the inverting voltage to a predetermined voltage range of a single positive power source to produce a level shift voltage, an adder connected to the level shift circuit for adding the level shift voltage to a second reference voltage to produce an added voltage, an variable attenuator connected to the adder for attenuating the added voltage with a predetermined coefficient on the basis of the second reference voltage to produce an attenuated voltage, a subtracter connected to the variable attenuator for subtracting the second reference voltage from the attenuated voltage to produce a subtracted voltage, a low-pass filter connected to the subtracter for filtering the subtracted voltage to produce a filtered voltage, and a voltage-current converting circuit connected to the low pass filter for converting the filtered voltage into a converted current to supply the converted current to the inverting input terminal.

DESCRIPTION OF THE PREFERRED EMBODIMENT

Figure 1:
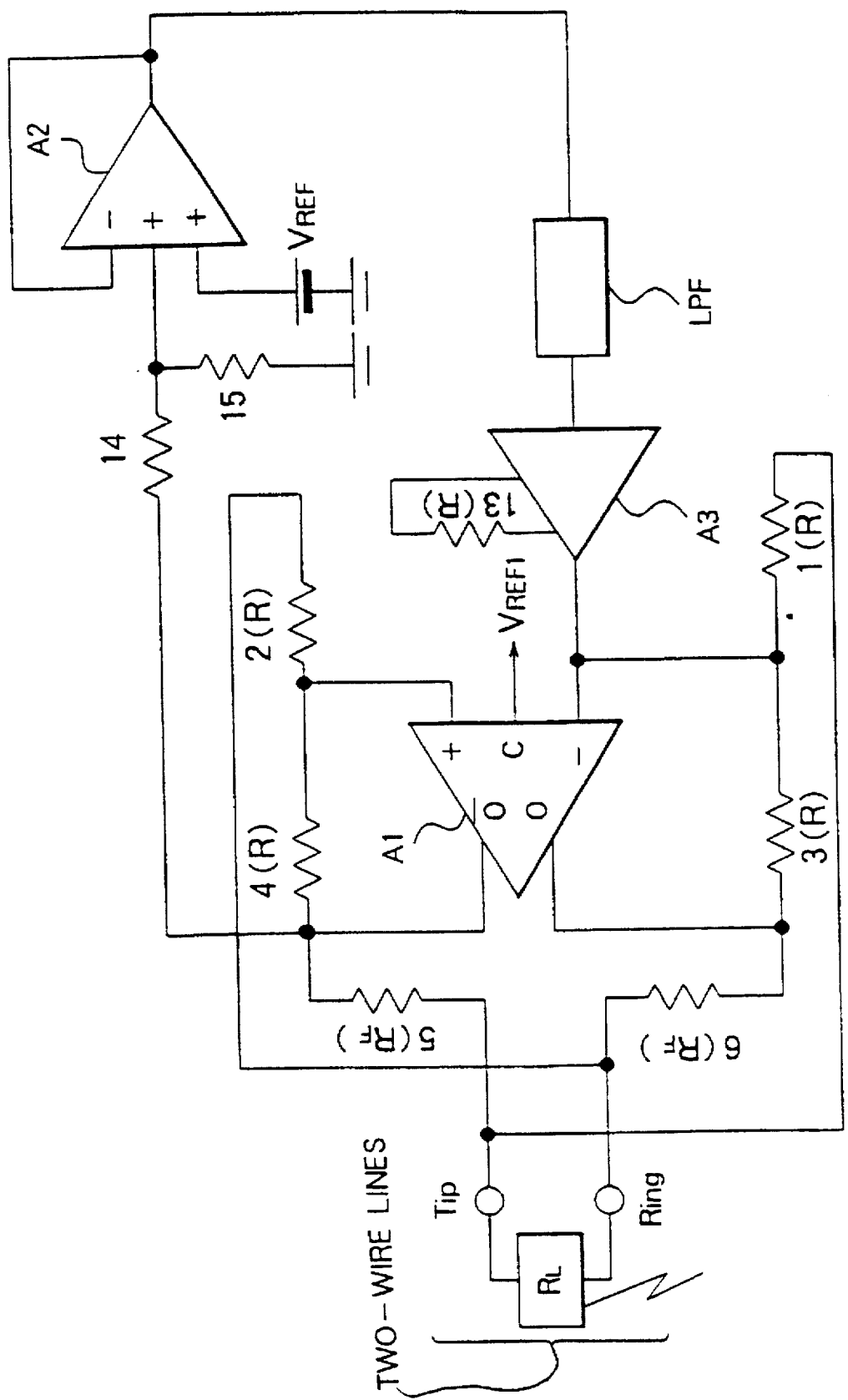
FIG. 1 shows a circuit arrangement of a conventional subscriber line interface circuit.

Referring to FIG. 1, description will be made with regard to a conventional subscriber line interface circuit in order to facilitate a better understanding of the present invention.

The subscriber line interface circuit is connected to two-wire lines having a line resistor of a line resistance $R_L$ through terminals Tip and Ring. The subscriber line interface circuit comprises a balanced amplifier A1 having inverting and non-inverting input terminals and inverting and non-inverting output terminals. The balanced amplifier A1 is for amplifying an input voltage applied between the inverting and the non-inverting input terminals and produces inverting and non-inverting outputs defined by inverting and non-inverting voltages which have the different polarity and the same amplitude on the basis of a first reference voltage $V_{REF1}$. A first resistor 1 is connected between the terminal Tip and the inverting input terminal. A second resistor 2 is connected between the terminal Ring and the non-inverting input terminal. A third resistor 3 is connected between the inverting input terminal and the non-inverting output terminal. A fourth resistor 4 is connected between the non-inverting input terminal and the inverting output terminal. Each of the first through the fourth resistors 1 to 4 has the same resistance value of R. A fifth resistor 5 is connected between the terminal Tip and the inverting output terminal. A sixth resistor 6 is connected between the terminal Ring and the non-inverting output terminal. Each of the fifth and the sixth resistors 5 and 6 has the same resistance value of $R_F$. Thus, a feedback line is formed from the terminal Tip to the inverting input terminal and the non-inverting output terminal through the first and the third resistors 1 and 3, respectively. Similarly, a feedback line is formed from the terminal Ring to the non-inverting input terminal and the inverting output terminal through the second and the fourth resistors 2 and 4, respectively. As a result, the balanced amplifier A1 has a gain which is equal to 1.

The inverting output terminal is grounded through resistors 14 and 15 having resistance values R14 and R15. An output voltage of the inverting output terminal is divided by the resistors 14 and 15. A divided voltage is supplied to a first non-inverting input terminal of a voltage discriminator A2. A second non-inverting input terminal of the voltage discriminator A2 is connected to a D.C (Direct Current)

voltage or power source having a reference voltage $V_{REF}$. In the voltage discriminator A2, the divided voltage becomes valid when the divided voltage is higher than the reference voltage $V_{REF}$. On the contrary, the reference voltage $V_{REF}$ becomes valid when the reference voltage $V_{REF}$ is higher the divided voltage. The voltage discriminator A2 has a voltage follower function. In other words, the voltage discriminator A2 serves as a buffer amplifier. In this case, the voltage discriminator A2 delivers an output voltage, by a low impedance, equal to the higher voltage which is valid.

The output voltage of the voltage discriminator A2 is supplied to a low-pass filter LPF. The low-pass filter LPF delivers a filtered voltage to a voltage-current converting circuit A3. The filtered voltage is converted by the voltage-current converting circuit A3 into an output current. The output current is supplied to the inverting input terminal of the balanced amplifier A1. In the voltage-current converting circuit A3, the filtered voltage is converted into the output current by a resistor 13 having the resistance value R. In this event, a conversion coefficient Gm is represented by the following equation.

$$Gm=1/R. \tag{1}$$

The balanced amplifier A1 has a reference detection voltage of in-phase feedback, which corresponds to the first reference voltage $V_{REF1}$ in order for balanced output. It is assumed that the first reference voltage $V_{REF1}$ is equal to a half of a negative power source voltage $V_{BB}$ (not shown) which is supplied to the balanced amplifier A1.

Let calculate an equivalent resistance value (feed resistance value) $R_{DC}$ watched from the terminals Tip and Ring and a line current $I_L$ that flows from the terminal Tip to the terminal Ring. Since the balanced amplifier A1 detects a half of the voltage applied between the inverting and the non-inverting output terminals and is connected to an in-phase feedback line, the voltage between the inverting output terminal and the ground is equal to that between the non-inverting output terminal and a power source terminal of the negative power source voltage $V_{BB}$. It is assumed that the voltage is equal to $V_2$. The voltage $V_2$ is divided by the resistors 14 and 15 into a divided voltage $V_D$. The divided voltage $V_D$ is represented by a following equation given by:

$$V_D=V_2\{R15/(R14+R15)\}. \tag{2}$$

Under the condition of $|V_D|>|V_{REF}|$, the divided voltage $V_D$ becomes valid as the input voltage of the voltage discriminator A2. The voltage discriminator A2 produces the divided voltage $V_D$ as the output voltage. By the low-pass filter LPF, an A.C (Alternate Current) component is extracted from the divided voltage $V_D$. As a result, the divided voltage $V_D$ has a D.C component only. The divided voltage $V_D$ is converted into the output current by the voltage-current converting circuit A3 with a coefficient 1/R. The output current is added to the input of the inverting input terminal in the balanced amplifier A1.

Since the balanced amplifier A1 is the in-phase feedback type, the voltage between the terminal Tip and the ground is equal to that between the terminal Ring and the power source terminal of the negative power source voltage $V_{BB}$. It is assumed that the voltage is equal to $V_1$. In this event, the voltage $V_1$ is represented by the following equations.

$$V_2=V_1-I_L R_F. \tag{3}$$

$$V_{BB}-2V_2=V_{BB}-2V_1+V_2 R15/(R14+R15). \tag{4}$$

$$V_1=(V_{BB}-I_L R_L)/2. \tag{5}$$

In this case, the following equation is given.

$$\beta=R15/(R14+R15). \tag{6}$$

As a result, the equation (4) is represented by the following equation given by:

$$2V_1=(2+\beta)V_2. \tag{4'}$$

From the equations (3) and (4'), the following equation can be obtained.

$$V_1=\{(\beta+2)/\beta\}I_L R_F. \tag{7}$$

The line current $I_L$ is represented by the following equation by using the equations (5) and (7) and by deleting the voltage $V_1$.

$$I_L=\frac{V_{BB}}{R_L+\dfrac{2(\beta+2)}{\beta}R_F} \tag{8}$$

From the above-mentioned balance characteristic of the circuit, the equivalent resistance (feed resistance) between the terminal Tip and the ground is equal to that between the terminal Ring and the power source terminal of the negative power source voltage $V_{BB}$. It is assumed that the resistance is equal to $R_{DC}$. In this event, the line current $I_L$ is represented by the following equation.

$$I_L=V_{BB}/(R_L+2R_{DC}). \tag{9}$$

From the equations (8) and (9), the following equation can be obtained.

$$R_{DC}=\{(\beta+2)/\beta\}R_F. \tag{10}$$

The equation (10) means that it is possible to voluntarily select the value of equivalent resistance (line resistance) $R_{DC}$ by changing the ratio of the resistance R14 to the resistance R15.

Next, under the condition of $|V_D|<|V_{REF}|$, the reference voltage $V_{REF}$ becomes valid as the input voltage of the voltage discriminator A2. The voltage discriminator A2 produces the reference voltage $V_{REF}$ as the output voltage. The equation (4) is exchanged to the following equation.

$$V_{BB}-2V_2=V_{BB}-2V_1+V_{REF}. \tag{11}$$

From the equations (3) and (11), the line current $I_L$ is represented by the following equation.

$$I_L=V_{REF}/2R_F. \tag{12}$$

This means that the line current $I_L$ is unrelated to the line resistance $R_L$. In other words, it is possible to obtain a required constant current characteristic by changing the reference voltage $V_{REF}$.

Figure 2:
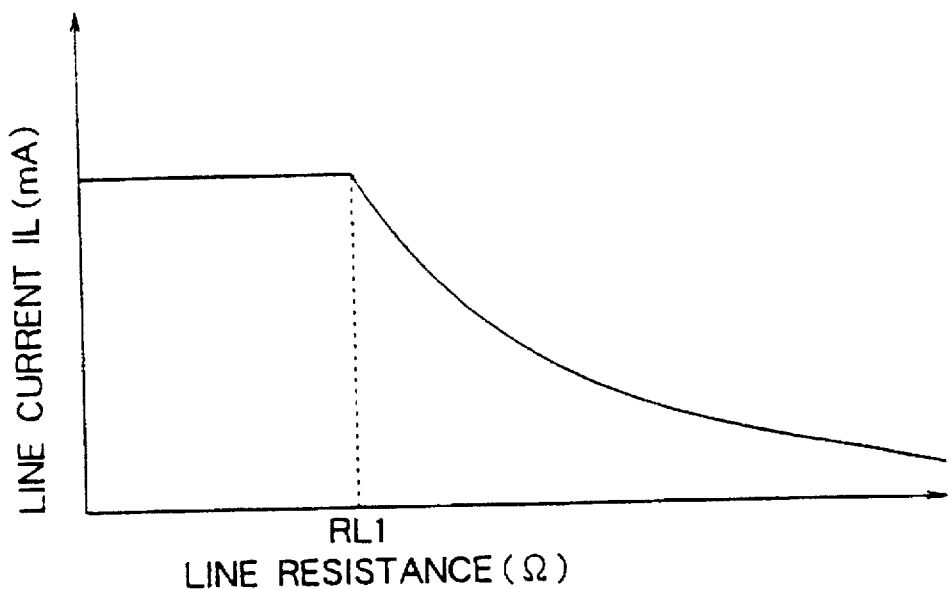
FIG. 2 shows a line resistance versus line current of the circuit illustrated in FIG. 1.
Figure 4:
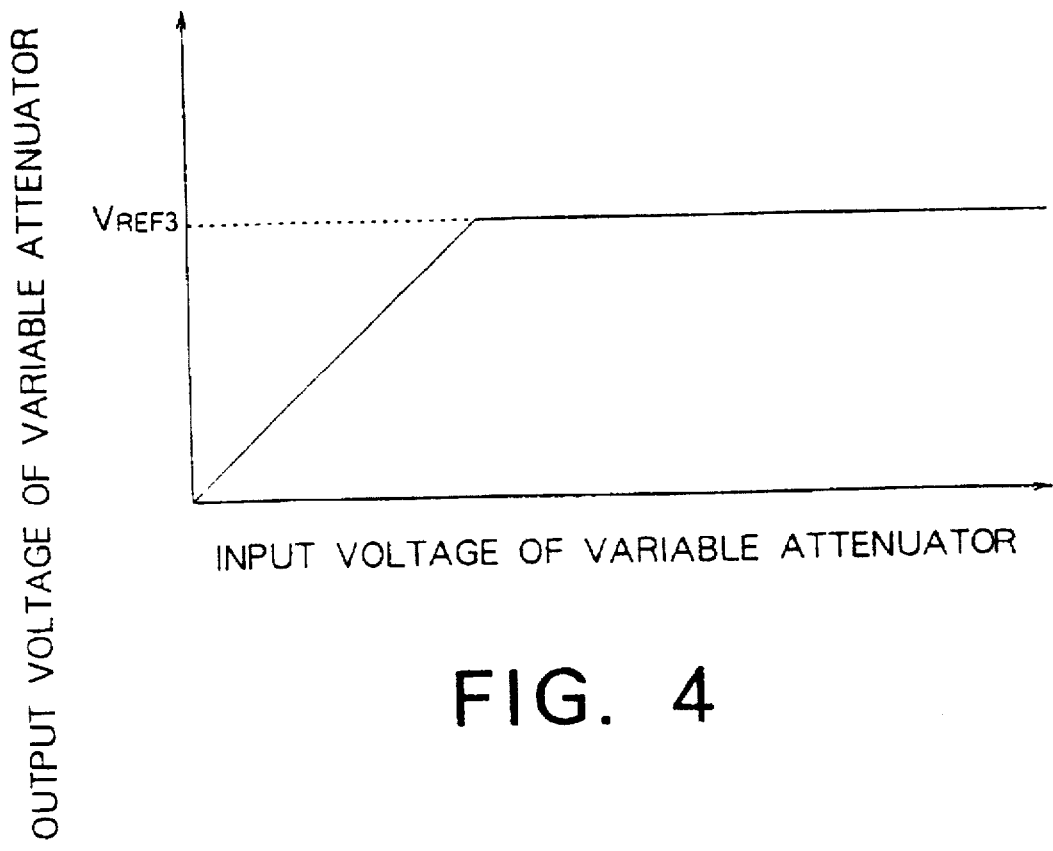
FIG. 4 shows an input voltage versus output voltage of a variable attenuator illustrated in FIG. 3.

Referring to FIG. 2, when the line resistance is lower than a specific value $R_{L1}$, the circuit has a constant resistance characteristic. When the line resistance is higher than the specific value $R_{L1}$, the circuit has a constant current characteristic.

The above-mentioned circuit is called a half constant current power supply type.. In this type, it is possible to reduce a power consumption while the circuit has the lower line resistance.

In the meanwhile, the above-mentioned subscriber line interface circuit requires the balanced amplifier A1 operable by the power source of −48 volts. Like the balanced amplifier A1, the voltage discriminator A2 and the low-pass filter LPF are also operable by the power source of −48 volts. This means that the low-pass filter LPF must be implemented by circuit elements having high withstand voltage characteristic. Such the circuit elements are expensive in cost. Similarly, the voltage discriminator A2 must be implemented by the circuit elements having the high withstand voltage characteristic. In particular, the low-pass filter LPF and the voltage discriminator A2 raise in cost when these are implemented by the LSI. In addition to high cost, these are not fit for changing the feed resistance, a constant of a constant current value, and the like, by software control by the use of a CPU and the like.

Figure 3:
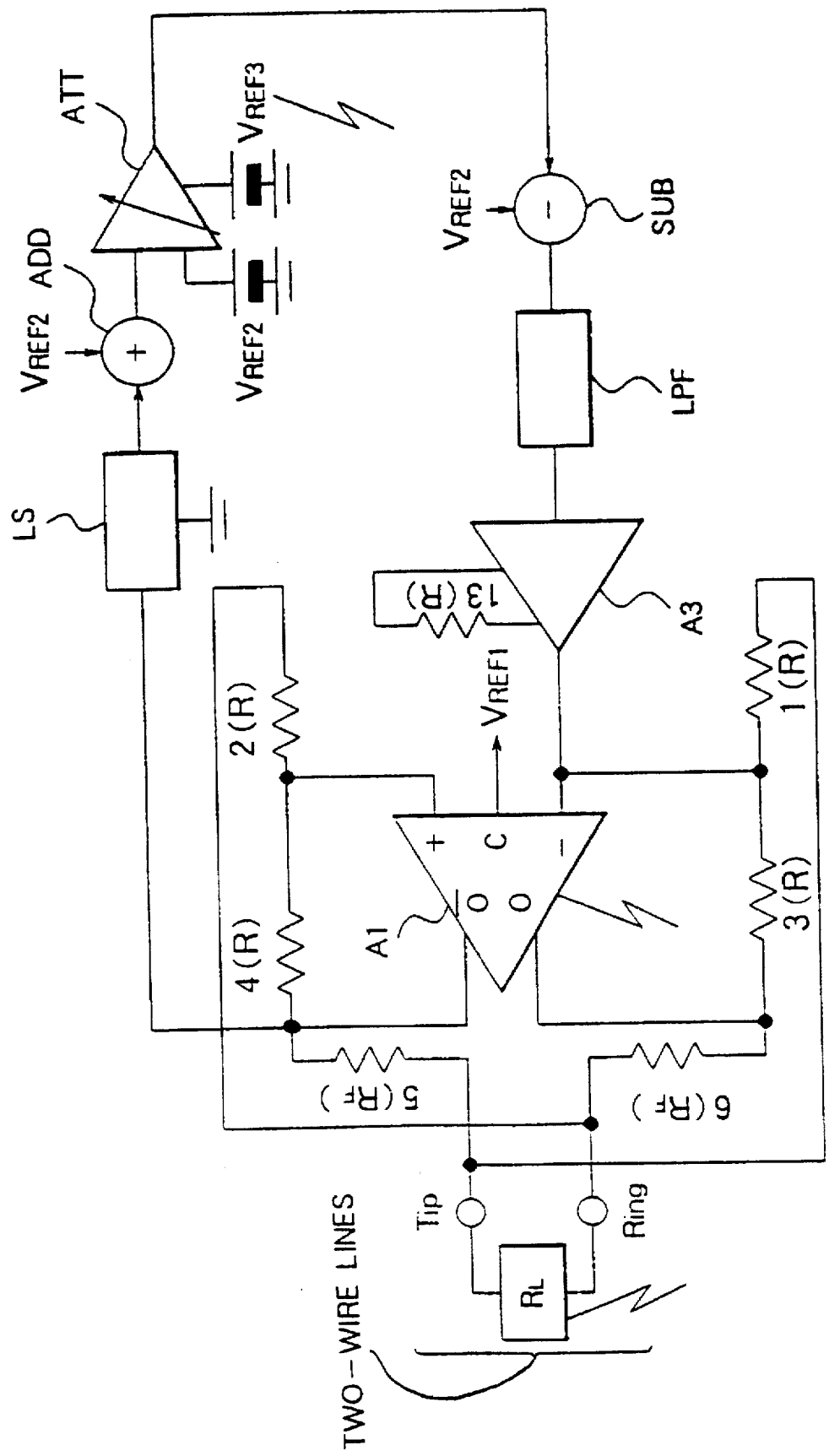
FIG. 3 shows a circuit arrangement of a subscriber line interface circuit according to this invention.

Referring to FIG. 3, the description will proceed to a subscriber line interface circuit according to a preferred embodiment of this invention. The circuit comprises similar parts illustrated in FIG. 1 except for a level shift circuit LS, an adder ADD, a Variable attenuator ATT of a programmable type, and a subtracter SUB.

The level shift circuit LS has an attenuation function and detects the voltage of the inverting output terminal in the balanced amplifier A1 in order for keeping the voltage down to the range of a single power source of 5 volts. Namely, the level shift circuit LS inverts the voltage on the basis of a ground potential and attenuates the voltage by a constant attenuation coefficient K1. The level shift circuit LS carries out level shift operation that shifts the voltage level from the power source system of −48 volts to that of +5 volts. The level shift circuit LS supplies a level Shift voltage $V_{LS}$ to the adder ADD. The adder ADD is supplied with a second reference voltage $V_{REF2}$ and adds the second reference voltage $V_{REF2}$ to the level shift voltage $V_{LS}$. The adder ADD supplies an added voltage $V_{ADD}$ to the variable attenuator ATT. The variable attenuator ATT is supplied with the second reference voltage $V_{REF2}$ and a third reference voltage $V_{REF3}$. The added voltage $V_{ADD}$ is attenuated by the variable attenuator ATT with a constant attenuation coefficient K2 on the basis of the second reference voltage $V_{REF2}$. The variable attenuator ATT supplies an attenuated voltage $V_{ATT}$ to the subtracter SUB.

The subtracter SUB is supplied with the second reference voltage $V_{REF2}$ together with the attenuated voltage $V_{ATT}$ and subtracts the second reference voltage $V_{REF2}$ from the attenuated voltage $V_{ATT}$. The subtracter SUB delivers a subtracted voltage $V_{SUB}$ to the low-pass filter LPF. The low-pass filter LPF removes the A.C component from the subtracted voltage $V_{SUB}$ and produces the filtered voltage which has the D.C component only. In the voltage-current converting circuit A3, the filtered voltage is converted into the output current by the resistor 13 having the resistance Value R. In this case, a conversion coefficient Gm is represented by Gm=K3/R. The output current I is represented by the following equation given by;

$$I = K3V/R. \quad (13)$$

The output current I is supplied to the inverting terminal of the balanced amplifier A1.

The description will proceed to the calculation of the equivalent resistance (feed resistance) RDC watched from the terminals Tip and Ring and the line current $I_L$ which flows from the terminal Tip to the terminal Ring. The calculation is basically the same calculation as that described in conjunction with FIG. 1. Therefore, the description will be omitted with regard to a calculation process for the same parts.

The level shift circuit LS is supplied with the voltage $V_2$ from the inverting terminal of the balanced amplifier A1. Since the level shift circuit LS has the constant attenuation coefficient K1 and has inverting function which inverts a polarity of the voltage V2, the level shift voltage VLS is represented by the following equation.

$$V_{LS} = -K1V2. \quad (14)$$

The added voltage $V_{ADD}$ delivered from the adder ADD is represented by the following equation.

$$ADD = -K1V_2 + V_{REF2}. \quad (15)$$

As the variable attenuator ATT attenuates the added voltage $V_{ADD}$ with the constant attenuation coefficient K2 on the basis of the second reference voltage $V_{REF2}$, the attenuated voltage $V_{ATT}$ is represented by the following equation.

$$V_{ATT} = -K1K2V2 + V_{REF2}. \quad (16)$$

As the subtracter SUB subtracts the second reference voltage $V_{REF2}$ from the attenuated Voltage $V_{ATT}$, the subtracted voltage $V_{SUB}$ is represented by the following equation.

$$V_{SUB} = -K1K2V2. \quad (17)$$

As obvious from the equation (17), the subtracted voltage $V_{SUB}$ is no influenced by the second reference voltage $V_{REF2}$.

Although the subtracted voltage $V_{SUB}$ has practically the A.C component, the A.C component is removed by the low-pass filter LPF. For convenience, the subtracted voltage $V_{SUB}$ represented by the equation (17) indicates the D.C component only. Therefore, the filtered voltage delivered from the low-pass filter LPF is equal to the subtracted voltage $V_{SUB}$.

The subtracted voltage $V_{SUB}$ is converted into the output current I by the voltage-current converting circuit A3 with the conversion coefficient K3/R. The output current I is supplied to the inverting terminal of the balanced amplifier A1 and is converted again into the voltage by the feedback resistance value R.

As described in conjunction with FIG. 1, the voltage $V_2$ between the inverting terminal and the ground is equal to that between the non-inverting terminal and the power source terminal of the negative power source voltage $V_{BB}$ because the balanced amplifier A1 has an output balance characteristic. On the other hand, the voltage V1 between the terminal Tip and the ground is equal to that between the terminal Ring and the power source terminal of the negative power source voltage $V_{BB}$.

Under the above-mentioned condition, the following equations are deduced.

$$V2 = V1 - I_L R_F. \quad (18)$$

$$V_{BB} - 2V2 = V_{BB} - 2V1 + K1K2K3V2. \quad (19)$$

$$V1 = (V_{BB} - I_L R_L)/2. \quad (20)$$

The equations (18) to (20) correspond to the equations (3) to (5), respectively, which are mentioned in conjunction with FIG. 1. In the same process mentioned before, the line current $I_L$ can be represented by the following equation.

$$I_L = \frac{V_{BB}}{R_L + \frac{2(K1K2K3 + 2)}{K1K2K3} R_F} \quad (21)$$

If the equivalent resistance (feed resistance) $R_{DC}$ presented between the terminal Tip and the ground is equal to that between the terminal Ring and the power source terminal of the negative power source voltage $V_{BB}$, the line current $I_L$ is represented by the following equation.

$$I_L = V_{BB}/(R_L + 2R_{DC}). \tag{22}$$

By using the equations (21) and (22), the equivalent resistance (feed resistance) $R_{DC}$ is represented by the following equation.

$$R_{DC} = \{(K1K2K3+2)/K1K2K3\}R_F. \tag{23}$$

As obvious from the equation (23), it is possible to voluntarily select the value of the equivalent resistance (feed resistance) $R_{DC}$ by changing the value of the K1, K2, and K3.

The variable attenuator ATT has a clamp function. By the clamp function, when the input voltage, namely, the added voltage $V_{ADD}$ raises to the third reference voltage $V_{REF3}$, the output voltage, namely, the attenuated voltage $V_{ATT}$ is clamped at the third reference voltage $V_{REF3}$.

Referring to FIG. 3, it is assumed a case that the attenuated voltage $V_{ATT}$ is Clamped at the third reference voltage $V_{REF3}$. From the equation (16), the case occurs on the condition that the following inequality is satisfied.

$$-K1K2V2 + V_{REF2} > V_{REF3}. \tag{24}$$

At this condition, it can be regarded as a feedback path returned from the inverting terminal to the non-inverting terminal is separated from the balanced amplifier A1. Furthermore, the attenuated voltage $V_{ATT}$ becomes equal to the third reference voltage $V_{REF3}$. The subtracted voltage $V_{SUB}$ is represented by the following equation.

$$V_{SUB} = V_{REF3} - V_{REF2}. \tag{25}$$

In this case, the above-mentioned equation (19) is replaced by the following equation.

$$V_{BB} - 2V2 = V_{BB} - 2V1 + K3(V_{REF3} - V_{REF2}). \tag{26}$$

By using the equations (18) and (26), the line current $I_L$ is represented by the following equation.

$$I_L = K3(V_{REF3} - V_{REF2})/2R_F. \tag{27}$$

As obvious from the equation (27), the line current $I_L$ becomes unrelated to the line resistance $R_L$. In other words, it is possible to obtain a required constant current characteristic by changing the third reference voltage $V_{REF3}$ and by making the second reference voltage $V_{REF2}$ a fixed value. As a result, the whole feed current characteristic becomes equivalent to that illustrated in FIG. 2. Namely, the line current $I_L$ becomes constant while the line resistance $R_L$ is lower than the specific value $R_{L1}$. Although the balanced amplifier A1 is operated by the power source system of –48 volts, the variable attenuator ATT, the low-pass filter LPF and so on are operable by the same source system of +5 volts. This means that the subscriber line interface circuit can be inplemented by the circuit elements having the low withstand voltage characteristic except for the balanced amplifier A1.

Figure 5:
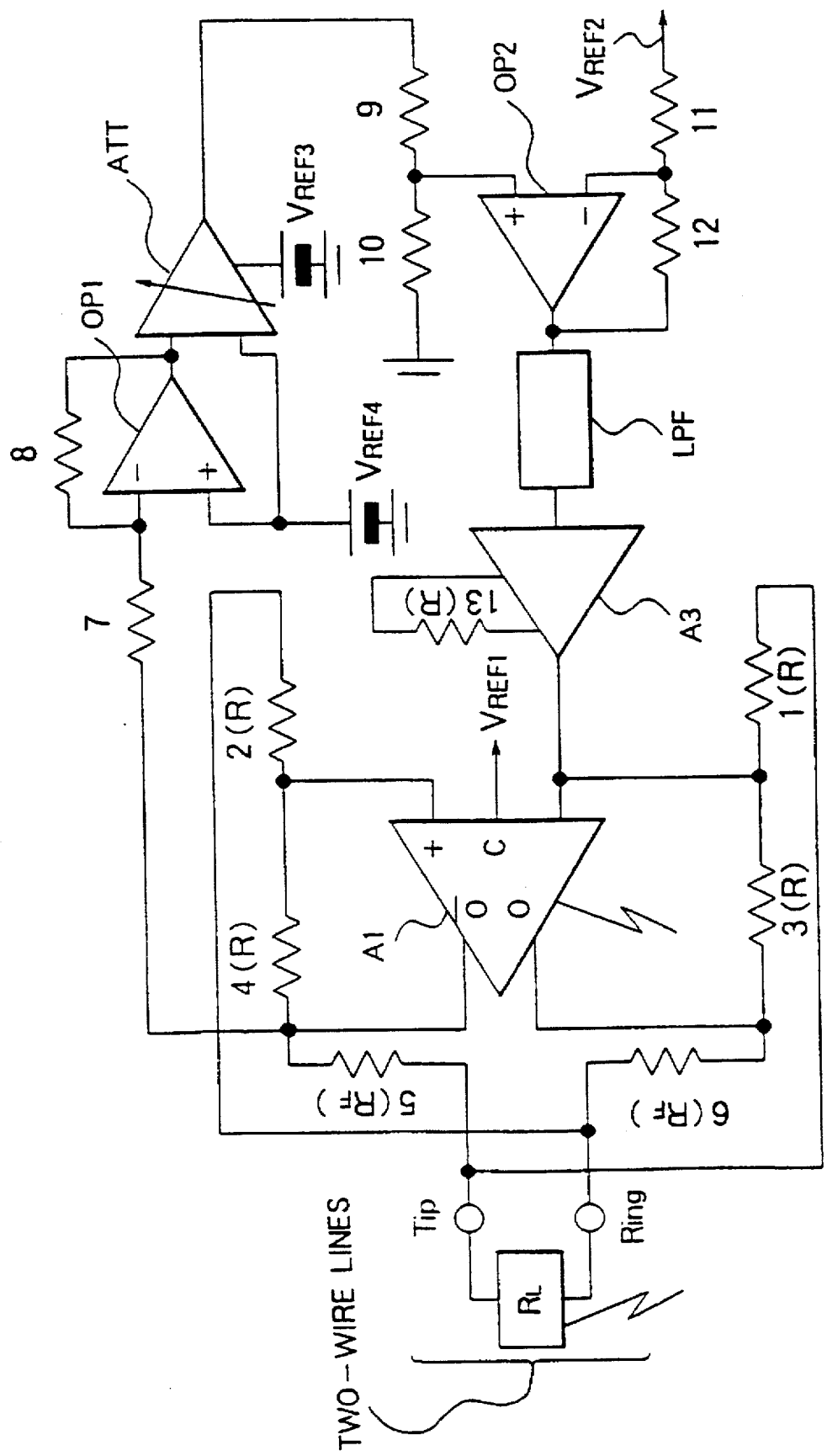
FIG. 5 shows a circuit arrangement for describing in detail a level shift circuit, an adder, and a subtracter illustrated in FIG. 3.

Referring to FIG. 5, the subscriber line interface circuit according to this invention will be described more in detail. The subscriber line interface circuit comprises similar parts designated by like reference numerals.

In FIG. 5, the level shift circuit LS and the adder ADD illustrated in FIG. 3 are implemented by seventh and eighth resistors 7 and 8, a first operational amplifier OP1, and a D.C voltage source for supplying a fourth reference voltage $V_{REF4}$. The seventh resistor 7 has one end connected to the inverting output terminal of the balanced amplifier A1. The first operational amplifier OP1 has first inverting and first non-inverting input terminals and a first output terminal. The first inverting input terminal is connected to another end of the seventh resistor 7. The eighth resistor 8 is connected between the first inverting input terminal and the first output terminal. The first non-inverting terminal is supplied with the fourth reference voltage $V_{REF4}$. The seventh and the eighth resistors 7 and 8 have resistance values R7 and R8, respectively.

The subtracter SUB illustrated in FIG. 3 comprises ninth through twelfth resistors 9, 10, 11, and 12 and a second operational amplifier OP2. The ninth resistor 9 has one end connected to the variable attenuator ATT. The second operational amplifier OP2 has second inverting and second non-inverting input terminals and a second output terminal. The second non-inverting input terminal is connected to another end of the ninth resistor 9. The tenth resistor 10 has one end connected to the second non-inverting input terminal and has another end which is grounded. The eleventh resistor 11 has one end connected to the second voltage and has another end connected to the second inverting input terminal. The twelfth resistor 12 is connected between the second inverting input terminal and the second output terminal. The second inverting input terminal is supplied with the second reference voltage $V_{REF2}$ through the eleventh resistor 11. The ninth through the twelfth resistors 9 to 12 have resistance. Values R9, R10, R11, and R12, respectively.

The first operational amplifier OP1 has level shift function and add function which are mentioned in conjunction with FIG. 3. The Operation characteristic required for the first operational amplifier OP1 is to obtain an output voltage $V_{OP1}$ equal to $(-K1V2+V_{REF2})$ which is represented by the equation (15). Such an operation characteristic can be obtained by setting the resistance values R7 and R8, and the fourth reference voltage $V_{REF4}$ so as to satisfy the following equation.

$$\begin{aligned} V_{OP1} &= V_{REF4} - R8(V2 - V_{REF4})/R7 \\ &= -K1V2 + V_{REF2}. \end{aligned} \tag{28}$$

In other words, it can be obtained by setting the resistance values R7 and R8, and the fourth reference voltage $V_{REF4}$ so as to satisfy the following equations.

$$V_{REF4} = V_{REF2}\{R7/(R7+R8)\}. \tag{29}$$

$$K1 = R8/R7. \tag{30}$$

Next, the operation characteristic required for the second operational amplifier OP2 is to obtain subtraction operation which is for subtracting the second reference voltage $V_{REF2}$ from the attenuated voltage $V_{ATT}$. Such a subtraction operation can be realized by forming a differential amplifier by the use of the second operational amplifier OP2 and the ninth through the eleventh resistors R9 to R12. Under the condition of R9=R10=R11=R12, an output voltage $V_{OP2}$ of the second operational amplifier OP2 is equal to $(V_{ATT} - V_{REF2})$. Thus, the required operation characteristic can be obtained.

According to the present invention, the subscriber line interface circuit can be realized by a C-MOS circuit of a low withstand voltage and a low cost because the level shift operation is carried out by the level shift circuit. It is fit for changing the feed resistance, the constant of the constant current value, or the like, by software control by the use of the CPU because the circuit elements are implemented by the C-MOS circuit of the low withstand voltage. Since the bias voltage is added in the level shift circuit, an A.C signal is never clamped even if the subscriber line interface circuit operates by a single power source. Moreover, the subscriber line interface circuit operates by a low power consumption.

While this invention has thus far been described in conjunction with a preferred embodiment thereof, it will readily be possible for those skilled in the art to put this invention into practice in various other manners. For example, the variable attenuator can be implemented by the following construction. Namely, a plurality of resistors connected in serial connect between the input terminal and the second reference voltage $V_{REF2}$. In this case, the plurality of resistors have a plurality of voltage division points. One of the plurality of voltage division points can selects by the use of an analog switch, or the like.

What is claimed is:

1. A subscriber line interface circuit connected to two-wire lines and comprising a balanced amplifier having inverting and non-inverting input terminals and inverting and non-inverting output terminals for amplifying an input voltage applied between said inverting and said non-inverting input terminals to produce inverting and non-inverting outputs defined by inverting and non-inverting voltages which have the different polarity and the same amplitude on the basis of a first reference voltage, a first resistor connected between one line of said two-wire lines and said inverting input terminal, a second resistor connected between another line of said two-wire lines and said non-inverting input terminal, a third resistor connected between said inverting input terminal and said non-inverting output terminal, a fourth resistor connected between said non-inverting input terminal and said inverting output terminal, a fifth resistor connected between the one line of said two-wire lines and said inverting output terminal, and a sixth resistor connected between the other line of said two-wire lines and said non-inverting output terminal, said subscriber line interface circuit further comprising:

a level shift circuit having attenuation function for shifting said inverting voltage to a predetermined voltage range of a single positive power source to produce a level shift voltage;

an adder connected to said level shift circuit for adding said level shift voltage to a second reference voltage to produce an added voltage;

an variable attenuator connected to said adder for attenuating said added voltage with a predetermined coefficient on the basis of said second reference voltage to produce an attenuated voltage;

a subtracter connected to said variable attenuator for subtracting said second reference voltage from said attenuated voltage to produce a subtracted voltage;

a low-pass filter connected to said subtracter for filtering said subtracted voltage to produce a filtered voltage; and a voltage-current converting circuit connected to said low pass filter for converting said filtered voltage into a converted current to supply said converted current to said inverting input terminal.

2. A subscriber line interface circuit as claimed in claim 1, wherein said variable attenuator has clamp function for clamping said added voltage at a third reference voltage when said added voltage raises to said third reference voltage.

3. A subscriber line interface circuit as claimed in claim 1, wherein said level shift circuit and said adder are implemented by:

a seventh resistor having one end connected to said inverting output terminal;

a first operational amplifier having a first inverting and a first non-inverting input terminals and a first output terminal, said first inverting input terminal being connected to another end of said seventh resistor;

an eighth resistor connected between said first inverting input terminal and said first output terminal; and a D.C voltage source connected to said first non-inverting input terminal for supplying a fourth reference voltage.

4. A subscriber line interface circuit as claimed in claim 1, wherein said subtracter comprises:

a ninth resistor having one end connected to an output of said variable attenuator;

a second operational amplifier having a second inverting and a second non-inverting input terminals and a second output terminal, said second non-inverting input terminal being connected to another end of said ninth resistor;

a tenth resistor having one end connected to said second non-inverting input terminal and having another end which is grounded;

an eleventh resistor having one end supplied with said second reference voltage and having another end connected to said second inverting input terminal; and a twelfth resistor connected between said second inverting input terminal and said second output terminal.

5. A subscriber line interface circuit comprising:

a balanced amplifier having a differential output pair and an input pair which are connected to first and second terminals of two-wire lines through a plurality of resistors for producing a detected voltage used for control of power supply;

level shift means for shifting level of said detected voltage to a predetermined shift voltage of a predetermined power supply;

an adder for adding a predetermined bias voltage to said predetermined shift voltage to produce an added voltage;

a variable attenuator for clamping said added voltage at a predetermined clamp voltage;

a subtracter for subtracting said predetermined bias voltage from said predetermined clamp voltage to produce a subtracted voltage;

a low-pass filter for filtering said subtracted voltage to produce a filtered voltage; and a voltage-current converting circuit for converting said filtered voltage into a converted current to supply said converted current to said input pair.

* * * * *